United States Patent [19]

Busch

[11] Patent Number: 5,671,966
[45] Date of Patent: Sep. 30, 1997

[54] DRIVE ASSEMBLY FOR A FOLDING TOP OF A MOTOR VEHICLE

[75] Inventor: Peter Busch, Mengkofen, Germany

[73] Assignee: ED. Scharwächter GmbH & Co., Remscheid, Germany

[21] Appl. No.: 568,042

[22] Filed: Dec. 6, 1995

[30] Foreign Application Priority Data

Dec. 7, 1994 [DE] Germany ............................ 44 43 405.7

[51] Int. Cl.⁶ ...................................................... B60J 7/12
[52] U.S. Cl. ............................................ 296/107; 296/117
[58] Field of Search ...................................... 296/107, 117, 296/116, 122

[56] References Cited

U.S. PATENT DOCUMENTS 4,776,630  10/1988  Fukutomi et al. ..................... 296/117
5,161,852  11/1992  Alexander et al. .................... 296/117

FOREIGN PATENT DOCUMENTS 4123774  7/1993  Germany ............................. 296/117

*Primary Examiner*—David M. Mitchell
*Assistant Examiner*—Hoa B. Trinh
*Attorney, Agent, or Firm*—Anderson Kill & Olick P.C.

[57] ABSTRACT

A drive assembly for a folding top of a motor vehicle, which is located in a top storage well, together with a main pillar and a tightening clamp, includes a bracket secured on a vehicle body and including pivot supports for the main pillar and the tightening clamp and a drive for pivoting the main pillar and the tightening clamp, with the drive including at least one electric motor provided at a side of the top, a reducer in which the bracket is accommodated, and a sequential control element for drivingly connecting the reducer with the main pillar and the tightening clamp.

4 Claims, 5 Drawing Sheets

DRIVE ASSEMBLY FOR A FOLDING TOP OF A MOTOR VEHICLE

BACKGROUND OF THE INVENTION

The present invention relates to a drive assembly for a folding top of a motor vehicle, which is located, together with a top main pillar and a tightening clamp, in a top storage well closed with a top storage well cover, and which includes a bracket having pivot supports for the pillar and the tightening clamp, and a motor for effecting pivoting of the pillar and the tightening clamp.

With a folding top including a main pillar and a tightening clamp and driven by an electric motor, with the tightening clamp blocking, in a closed position of the top, the top storage well cover, which is secured on a vehicle body for pivotal movement in a direction opposite to the pivotal direction of the main pillar, it is necessary to lift the tightening clamp from its cover blocking position before moving the top into the top storage well. To this end, in conventional drive assemblies for folding tops, there is provided a separate electric motor for pivoting the tightening clamp, which operates independently of the main pillar motor and provides for pivotal movement of the clamp in a direction opposite to the pivotal direction of the pillar. With such a drive assembly, in addition to costs associated with providing a control system for the drive associated with the clamp, costs of a separate electric motor are added. With this conventional drive assembly, the rear main pillar and the tightening clamp of the top are driven with two separate transmission rods, which are arranged adjacent to each other in the top storage well and are connected to the pillar and the clamp, respectively. The two electric motors, which are located in the top storage well, also extend into the vehicle trunk and, thus, occupy some trunk space, whereas the transmission rods, which usually are subjected to dangerous bending forces, also require providing additional space in the top storage well. Further, connecting the drive assembly to the top parts and the necessary adjustments, which take place on the assembly line, involve additional increase in labor costs and result in increase of the expensive assembly time.

German patents Nos. 3,937,764 and 3,901,051 disclose using a hydraulic drive for folding tops. The hydraulic drive include a single pressure cylinder which provides for independent from each other pivotal movements of the pillar and the clamp in opposite directions. The pressure cylinder, which is generally associated with the pillar drive unit, is mounted on an adjustable support provided on the vehicle body or on a bracket attached to the body. The adjustable support is formed as a tiltable triangular link assembly, which is connected with the tightening clamp with a tie rod or the like in such a way that the pivotal movement of the support results in a pivotal movement of the tightening clamp. The movement of the support is so associated with the operation of the pressure cylinder that, as soon as a cylinder-operated force-transmitting element, which is connected with the pillar, abuts a stop determining the upright position of the pillar, a further movement of the cylinder or its piston rod arrests the support movement.

A drawback of such a drive assembly consists in that it requires a permanent connection of the tightening clamp with the support to insure retaining the clamp in any one of the two possible positions thereof. A further drawback consists in that the drive transmitting element, which connects the pressure cylinder with the pillar and is formed of tooth segments, requires mounting of the pressure cylinder in an inclined position that, in turn, requires providing a relatively large support bracket inside the vehicle body.

Accordingly, an object of the invention is a drive assembly for a folding top of a motor vehicle having a simplified structure.

Another object of the invention is a drive assembly for a folding top of a motor vehicle which would be less expensive than conventional drive assemblies.

Yet another object of the invention is a drive assembly for a folding top of a motor vehicle which would require substantially less mounting space.

A further object of the invention is a drive assembly for a folding top of a motor vehicle which would require less time and labor expenditure for mounting it in the motor vehicle.

SUMMARY OF THE INVENTION

These and other objects of the invention, which will become apparent hereinafter, are achieved by providing a drive assembly including at least one electric motor provided at a top side, a reducer, in which the bracket carrying pivot supports of the main pillar and the tightening clamp is accommodated, and a sequential control element connecting the reducer with the main pillar and the tightening clamp. Mounting an electric motor, together with associated drive elements, on the bracket permits to eliminate precise parts of the force-transmitting elements. In addition, the mechanical restraining or load-absorbing elements, conventionally provided on the vehicle body, can also be eliminated, because the load associated with the rotational torque generated by the electric motor is absorbed by the bracket itself. By placing the elements of the electrical drive on the bracket instead of the top storage well, additional useful space is provided in the vehicle trunk. Further, by the elimination of the force-transmitting tie rods, additional free space becomes available in the top storage well, which can be used for storing a folding top having increased dimensions, which a top provided with a rear window pane would have. By forming the reducer and the bracket, which supports the electric motor and the drive elements, as a unit which can be made integral with the top or which is easily connectable therewith, the assembly time for mounting the top in a vehicle on an assembly line is reduced. In addition, labor expenditure and thus labor costs are also reduced, as no adjustment and connection of the drive assembly with the top are necessary. Such a drive assembly goes a long way to meet the requirement of the automotive industry in compact modular assembly units.

According to the invention, the sequential control element for driving the pillar and the clamp is formed as a substantially V-shaped drive lever, one arm of which is operationally connected with the main pillar and the other arm of which is operationally connected with the tightening clamp. At that, the other arm becomes operationally connected with the tightening clamp only in the substantially upright position of the main pillar in which the top occupies a position intermediate between the top open and closed positions. In this way, it is provided that the drive lever arm associated with the tightening clamp is operationally connected to the clamp only in a predetermined pivotal region so that the drive connection between the other arm of the drive lever and the clamp takes place only in this region in which the tightening clamp, which is usually disconnected from the motor, is driven by the motor.

According to the invention, the sequential control element further comprises a two-arm lever which is pivotally supported on the bracket for pivotal movement in a direction opposite to the pivotal direction of the drive lever. One arm of the two-arm lever is drivingly engageable with the other arm of the drive lever, with the other arm of the two-arm lever being connected with the tightening clamp to transmit a rotational torque to the clamp.

According to the invention, another arm of the drive lever includes a roller-equipped journal for engaging a forked end region of one arm of the two-arm lever for pivoting the two-arm lever and thereby the tightening clamp.

In accordance with the invention, there is provided an arcuate connecting rod one end of which is connected with the arm of the drive lever associated with the pillar, and the other end of which is connected to the main pillar at a point spaced a small distance from a pivot axle of the main pillar for transmitting a rotational torque to the main pillar.

The drive assembly according to the present invention further comprises link elements for connecting another arm of the two-arm lever with the tightening clamp. The link elements include an intermediate link having one of its ends connected to the tightening clamp and another of its ends connected to the arm of the two-arm lever associated with the tightening clamp.

The drive assembly according to the invention further includes a control link having its one end connected to the bracket and its other end connected to the arcuate connecting rod for controlling pivotal movement of the main pillar.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
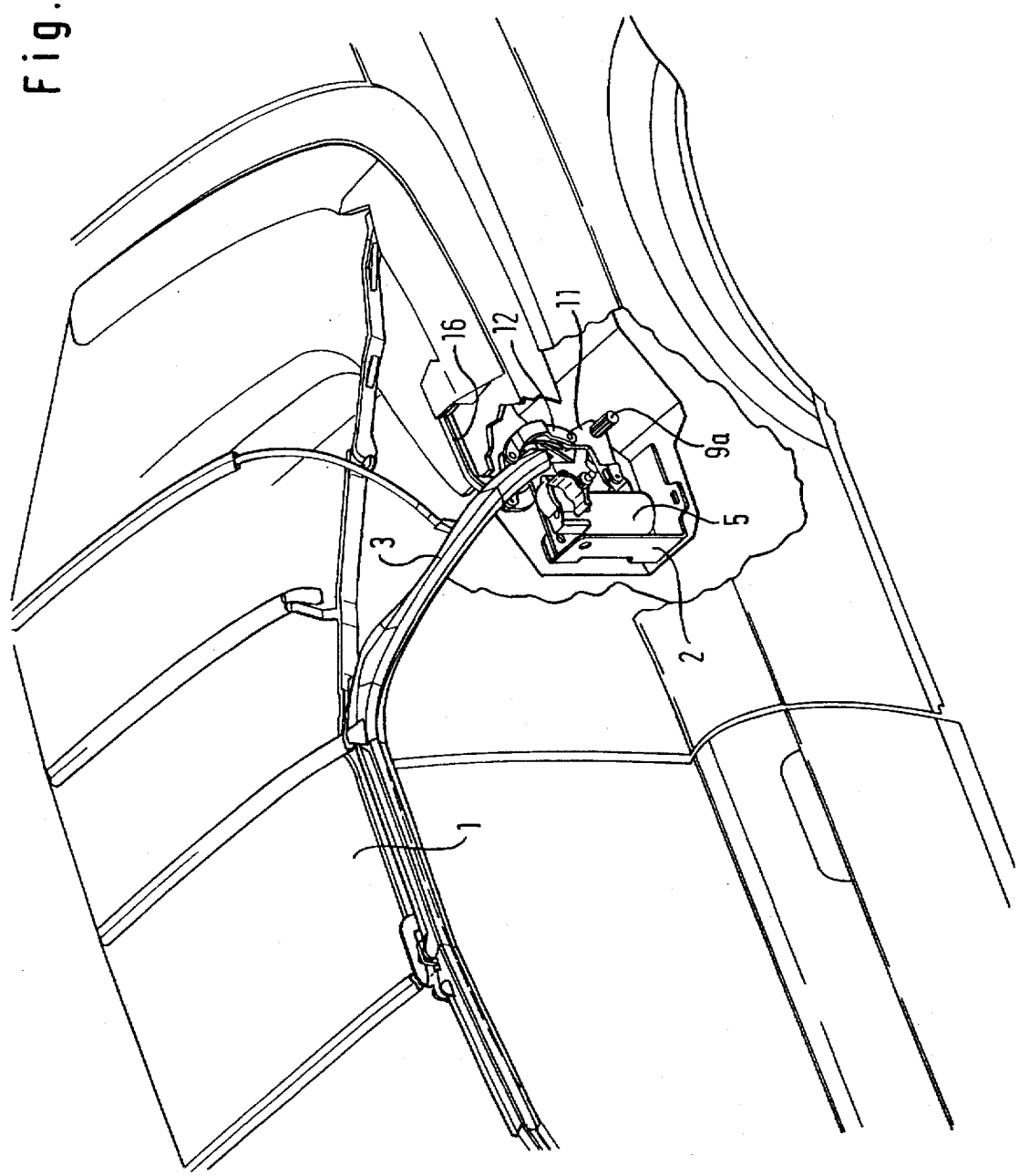
FIG. 1 shows a schematic view of a drive assembly for a folding top of motor vehicle according to the present invention.
Figure 2:
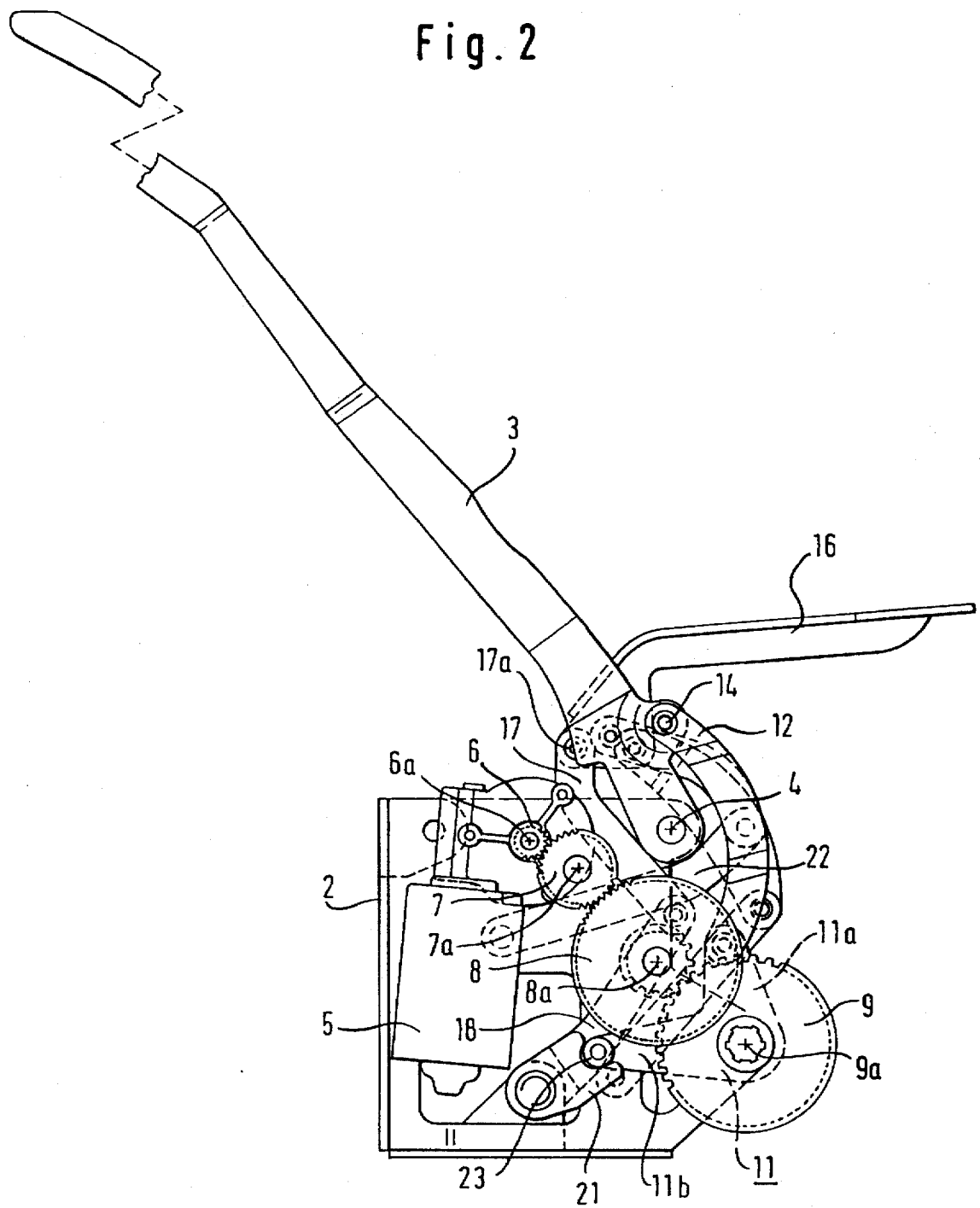
FIG. 2 is a side view from outside of a drive assembly according to the present invention, with a completely closed top.
Figure 3:
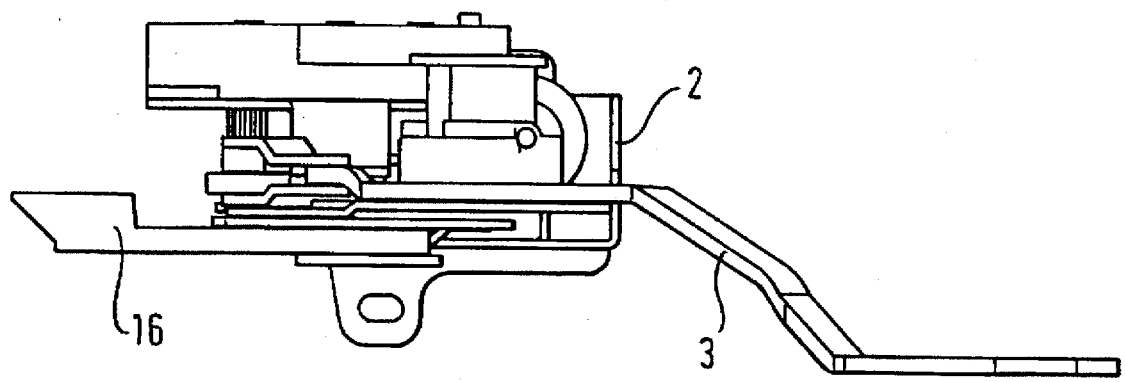
FIG. 3 is a plan view of a drive assembly according to the present invention, with the top being closed.
Figure 4:
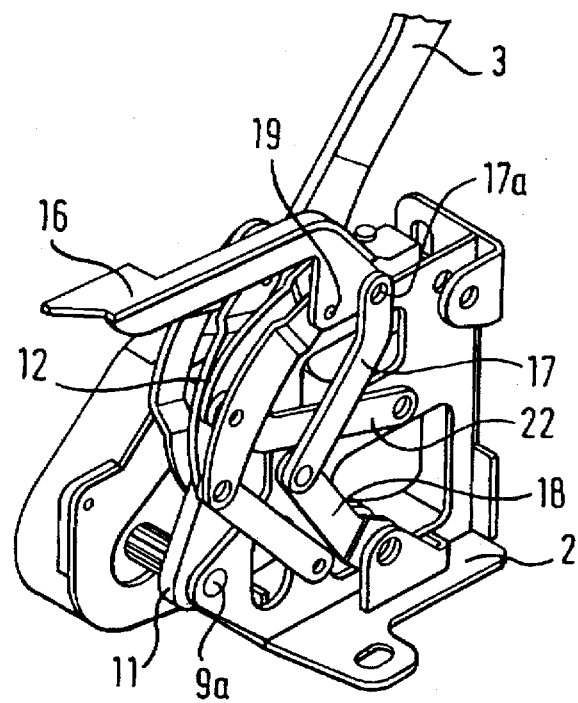
FIG. 4 is a perspective view of the drive assembly according to the present invention, with a completely closed top.
Figure 5:
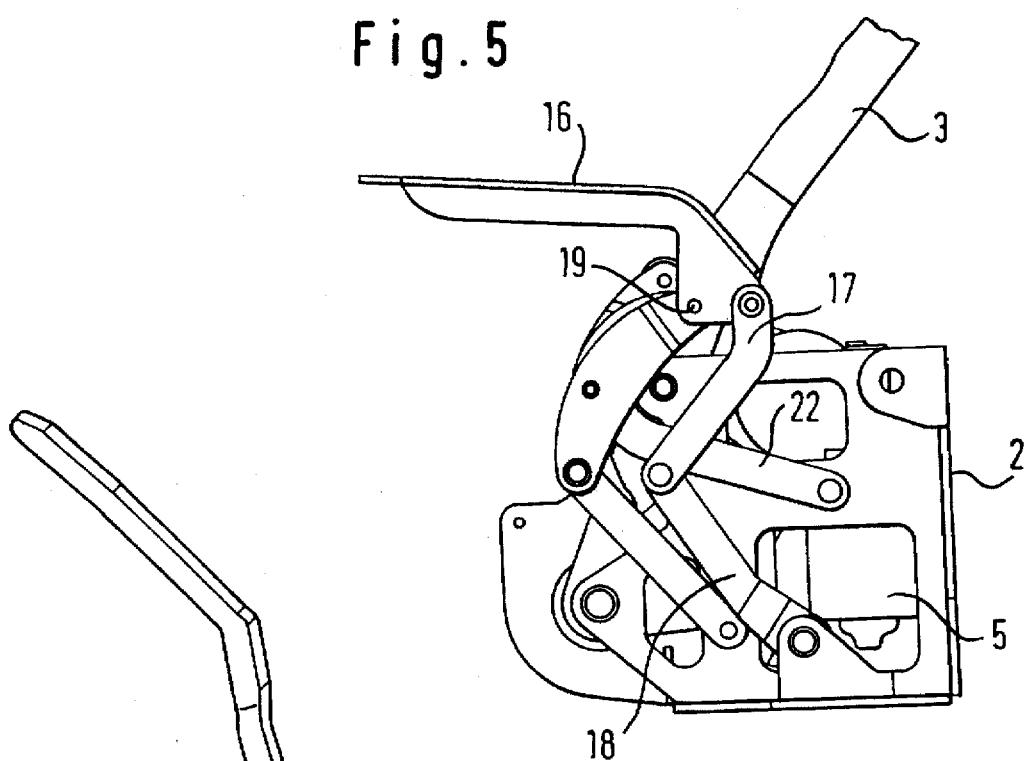
FIG. 5 is a side view from inside of the drive assembly according to the present invention, with a completely closed top.
Figure 6:
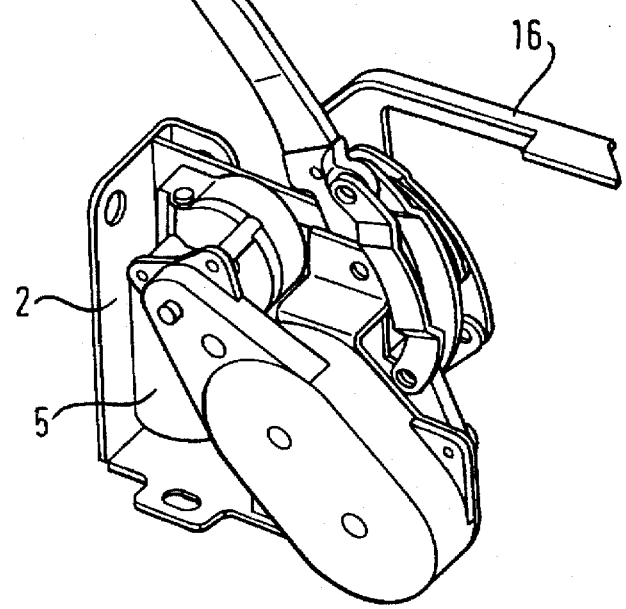
FIG. 6 is a schematic outside perspective view of the drive assembly according to the present invention, with a completely closed top.
Figure 7A:
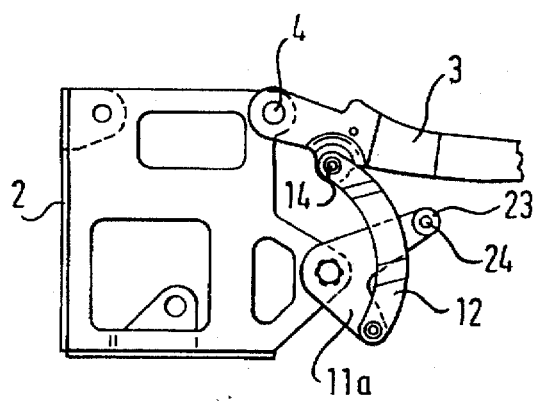
FIG. 7A is a schematic view of the drive assembly according to the present invention, with a completely open top.
Figure 7B:
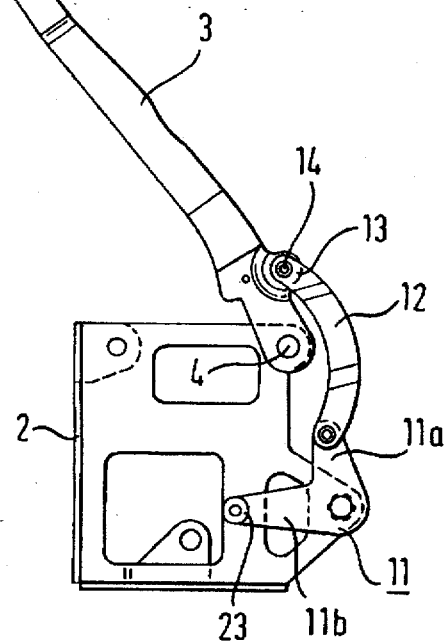
FIG. 7B is a schematic side view of the drive assembly according to the present invention, with a partially open top.
Figure 7C:
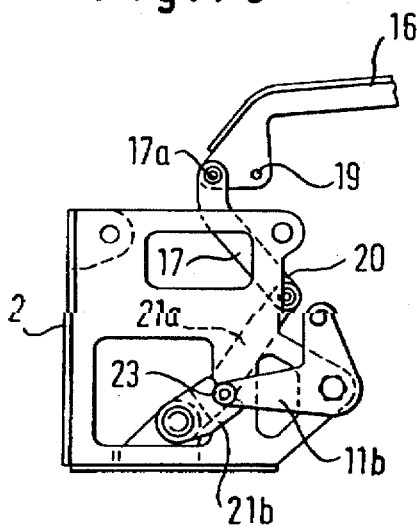
FIG. 7C is a schematic side view of the drive assembly according to the present invention, with a partially open top and the tightening clamp being still in its engaged position.
Figure 7D:
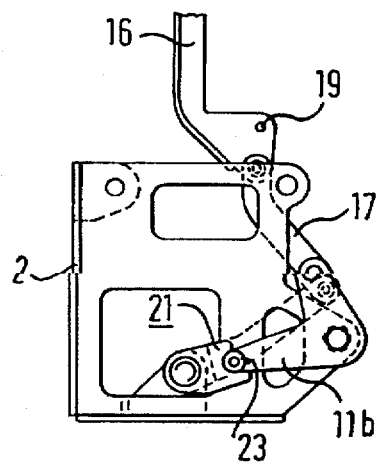
FIG. 7D is a side view of the drive according to the present invention, with the tightening clamp being in its completely lifted position.

The drawing figures show a drive assembly for closing and opening a folding top 1 of a motor vehicle. The assembly may be provided on one of rear sides of the vehicle or on both rear sides. In order to be able to show separate parts in the drawings, they are mainly shown in full lines, independent on whether the particular parts are visible in the corresponding views. The vehicle folding top 1 is symmetrical relative to the longitudinal axis of the vehicle, so that the parts of the tops located opposite the proximate parts are not shown.

In the drawings, a main pillar 3 is mounted on a bracket 2, which is secured to the vehicle body, for pivotal movement about an axle 4. A drive for the main pillar 3 includes an electric motor 5 and a speed reducer including spur gears 6, 7, 8 and 9 supported on axles 6a, 7a, 8a and 9a, respectively. The reducer transmits the rotational torque from the electric motor 5 to a drive lever 11 which is formed as a bell crank lever. An arcuate connecting rod 12 has one of its opposite end supported on the arm 11a of the bell crank lever 11 and the other end 13 attached to the main pillar 3 at a small distance from the axle 4. The end 13 of the connecting rod 12 is secured to the main pillar 3 in such a way that the main pillar 3 moves into its folded back position upon rotation of the gear 9 in a counter clockwise direction, and moves into its unfolded position upon rotation of the gear 9 in a clockwise direction. During the movement of the main pillar 3, the connection portion 14 of the connecting rod 12 moves along an arc about the axle 4.

The tightening clamp 16 is supported on the bracket 2 for pivotal movement about a pivot axle 19 extending parallel to the axle 4 of the main pillar 3. The tightening clamp 16 is supported for pivotal movement with a link element 17, 18. The link element includes an intermediate link 17 having one of its ends attached to the tightening clamp 16 and the other end 20 attached to a lever arm 21a of a two-arm lever 21. The intermediate link 17 is attached to the tightening clamp 16 at a point 17a located a small distance from a pivot axle 19. The pivot movement of the tightening clamp 16 is effected with the other arm 11b of the bell crank lever 11. The lever arm 11b is provided on its free end with a sidewise extending journal 24 which supports a roll 23. The journal 24 is designed for pivoting the tightening clamp 16 and is so arranged that it engages the arm 21b and, thus, is drivingly connected thereto only when the main pillar 3 has been displaced to its almost completely folded back position. In this way, the lever arm 11b becomes engaged with the tightening clamp 16 only in a position intermediate between the open and closed positions of the top and only along a predetermined pivot region, so that the drive lever 11 is drivingly connected with the tightening clamp 16 only in this region during the independent pivotal movement of the tightening clamp 16 by the drive lever 11.

For securing the main pillar 3 in its folded back position, it is provided with a stop which cooperates with a corresponding surface of the bracket 2. The pivotal movement of the main pillar 3 is controlled with a control link 22 which is connected at its opposite ends to the bracket 2 and the connecting rod 12, respectively.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A drive assembly for a folding top of a motor vehicle including main pillar means and tightening clamp means located in a top storage well which is closed with a top storage well cover, said drive assembly comprising:

a bracket secured on a vehicle body and including pivot supports for the main pillar means and the tightening clamp means; and drive means for pivoting the main pillar means and the tightening clamp means;

wherein the drive assembly includes at least one electric motor provided at a side of the top, a bracket in which a reducer is accommodated, and sequential control means for drivingly connecting the reducer with the main pillar means and the tightening clamp means, wherein the sequential control means comprises a substantially V-shaped drive lever one arm of which is connected with the main pillar means and another arm of which is connected with the tightening clamp means, wherein the sequential control means further comprises a two-arm lever pivotally supported on the bracket so that it pivots in a direction opposite to a pivotal direction of the drive lever, and wherein one arm of the two-arm lever is engageable with the another arm of the drive lever and another arm of the two-arm lever is connected with the tightening clamp means for transmitting to the tightening clamp means rotational torque from the electric motor.

2. A drive assembly as set forth in claim 1, wherein the another arm of the drive lever includes a roller-equipped journal for engaging a forked end region of the one arm of the two-arm lever for effecting pivoting of the tightening clamp means.

3. A drive assembly as set forth in claim 2, further comprising link means for connecting the another arm of the two-arm lever with the tightening clamp means, the link means comprising an intermediate link having one end thereof connected to the tightening clamp means and another end thereof connected to the another arm of the two-arm lever.

4. A drive assembly as set forth in claim 3, further comprising a control link having one end thereof connected to the bracket and the other end thereof connected to the arcuate connecting rod for controlling pivotal movement of the main pillar means.

* * * * *